United States Patent
Fuhrmann

(10) Patent No.: US 7,836,208 B2
(45) Date of Patent: Nov. 16, 2010

(54) DEDICATED REDUNDANT LINKS IN A COMMUNICATON SYSTEM

(75) Inventor: Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 178 days.

(21) Appl. No.: 11/917,591

(22) PCT Filed: Jun. 19, 2006

(86) PCT No.: PCT/IB2006/051956

§ 371 (c)(1),
(2), (4) Date: Dec. 14, 2007

(87) PCT Pub. No.: WO2006/136997

PCT Pub. Date: Dec. 28, 2006

(65) Prior Publication Data

US 2008/0201491 A1    Aug. 21, 2008

(30) Foreign Application Priority Data

Jun. 24, 2005    (EP)    ................... 05105682

(51) Int. Cl.
*G06F 15/16*    (2006.01)
*G06F 15/173*    (2006.01)
*G01R 31/08*    (2006.01)

(52) U.S. Cl. .................. 709/250; 709/238; 709/239; 370/217

(58) Field of Classification Search .......... 709/238, 709/239, 250; 370/217
See application file for complete search history.

(56) References Cited

U.S. PATENT DOCUMENTS

| | | | |
|---|---|---|---|
| 6,327,400 | B1 | 12/2001 | Harstead et al. |
| 6,535,481 | B1* | 3/2003 | Andersson et al. .......... 370/225 |
| 2002/0067693 | A1* | 6/2002 | Kodialam et al. .......... 370/216 |
| 2002/0112072 | A1* | 8/2002 | Jain .......................... 709/239 |
| 2003/0009582 | A1* | 1/2003 | Qiao et al. .................. 709/233 |
| 2003/0117950 | A1* | 6/2003 | Huang ........................ 370/220 |

* cited by examiner

*Primary Examiner*—Ranodhi N Serrao

(57) ABSTRACT

The invention relates to active star coupler based network handling of redundancy in the physical layer by transmitting a message to both regular and redundant links. In an error free case, the message is forwarded by the regular interface, while the redundant link, is blocked. Each interface is equipped with link failure detection logic. If a link failure is detected, an incoming message is blocked and the affected interface controls the interface connected to the redundant link to take over message forwarding. If the link recovers, the regular interface takes over forwarding responsibility and the redundant link is disabled.

12 Claims, 1 Drawing Sheet

DEDICATED REDUNDANT LINKS IN A COMMUNICATON SYSTEM

Figure 1:
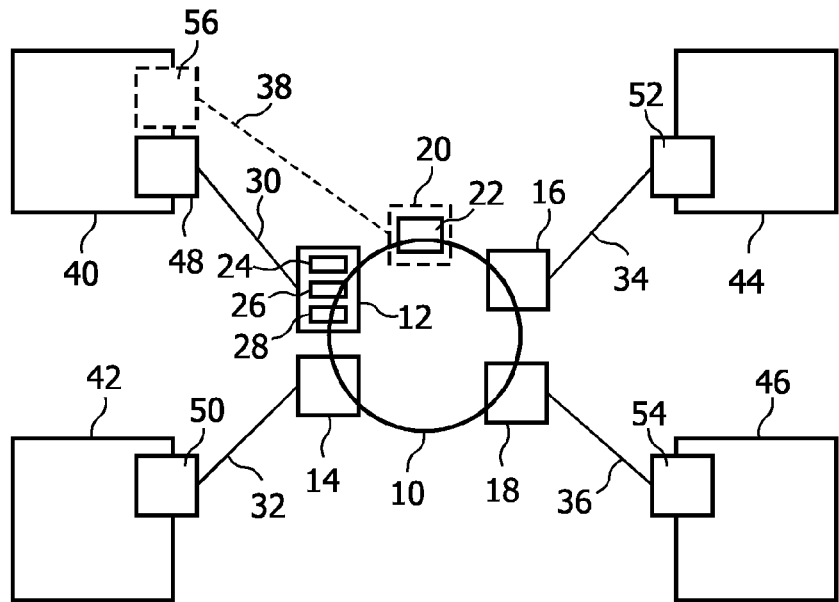

This invention relates in general to a communication network system and a method for communicating information between communication nodes, particularly for use in safety relevant applications, for example in the automotive domain.

For safety relevant applications a fault tolerant and reliable communication system is required. This requirement applies to all layers of the communication stack, especially to the physical layer. The physical layer comprising cables, connectors and the signalling interface exhibits in the given harsh environment susceptibility to a large number of possible faults. Typical faults in the automotive field are short cuts, broken layers or disconnected, i.e. interrupted channels, for example caused by corroded connectors. In order to increase the fault tolerance in the physical layer, prior art communication network systems are provided with two full redundant communication channels. That means each component required for a communication channel is contained twice in such communication network systems known in the prior art.

It is an object of the present invention to provide a communication network system and a method for communicating information providing increased fault tolerance, but at the same time being cost and space efficient.

In order to solve the above object, according to the present invention a communication network system is provided, which comprises a coupling device having at least two standard coupler interfaces and a redundant coupler interface, and being adapted to exchange information between the interfaces; at least two standard links for transmitting information, one of which is a critical link, and each of which is connected to one of the standard coupler interfaces; a redundant link for transmitting information, which is associated with the critical link and is connected to the redundant coupler interface; and at least two terminals, each having a standard terminal interface connected to one of the standard links, and at least one of which having a redundant terminal interface connected to the redundant link. Further, one of the redundant coupler interface and the redundant terminal interface comprises first blocking means for blocking information received from and/or sent to the redundant link; one of the standard coupler interface connected to the critical link and the standard terminal interface connected to the critical link comprises detection means for detecting a link fault in the critical link, and second blocking means for blocking information received from and/or sent to the critical link in response to a detection of a link fault in the critical link. Finally, the communication network system according to the invention comprises control means for controlling the first blocking means, being adapted to send an enable signal to the first blocking means in response to a detection of a link fault in the critical link, causing a de-blocking of the information received from and/or sent to the redundant link by the first blocking means.

For de-blocking the information received from and/or sent to the redundant link the first blocking means are switched into a mode, in which they do not block any information received. In this case information received from the redundant link is allowed to be forwarded by the coupling device to at least another one of the coupler interfaces. Further, information sent to the redundant link from at least another one of the interfaces is allowed to pass the first blocking means in order to enter the redundant link. The detection means for detecting a link fault in the critical link can be configured to interpret missing activity in the critical link or steady activity (for example shortage to one voltage level) as a link fault. In many cases TDMA-Technology (Time Division Multiple Access) is used for transmitting the information in the communication network system. TDMA works by dividing a radio frequency into time slots and then allocating slots to multiple calls. For such TDMA-systems, being based on a repetitive cycle of defined length, missing activity could be derived from the fact that during a time interval greater than the communication cycle no message (=activity) has been received. The link failure detector has to be adapted to the specific media access characteristics of the target communication system (e.g. if a silence period of more than one communication cycle is a valid scenario). This "failure detection latency" defines the maximum blackout time for the network. Further, the detection means can be configured to recognize a link fault from other measurements identifying a shortcut and/or an open in the critical link, e.g. by measuring the impedance of the link. A link fault can also be detected by the detection means by recognizing a "transmission fault" in the signal received from the critical link. That means, before the signal is sent via the critical link it is encoded using a predetermined code. After transmission via the critical link the detection means verify the code in the signal received. In case the code determined by the detection means does not concur with the predetermined code a "transmission fault" has occurred in the critical link, which is attributed to a link fault.

The communication network system according to the invention improves the fault tolerance without having to double all components of a respective communication channel between all terminals of the communication system, namely the individual links coupling devices and/or respective interfaces etc. Rather, only the critical link between one of the terminals and the coupling device is provided with a backup link, namely the redundant link. Therefore, the physical layer comprises a confined number of components and is therefore cost and space efficient. For many applications it is highly important that specific devices (for example an electronic control unit) or a function from an application point of view are available. Using the communication network system according to the invention the availability of such specific devices can be insured by connecting them to the critical link or to several critical links. At the same time there is no need to put up with the space and cost requirements of providing a full redundant communication channel in the communication network. Further end devices connected to the terminals do not have to be provided with communication channel diagnostic means and selection means for selecting a communication channel of choice.

By blocking the information received from the redundant link or alternatively the information received from the critical link a collided signal traversing the coupling device is avoided. As a collided signal regularly causes loss of information, the measures according to the invention improve signal quality of the information arriving at the terminals. Preferably, the coupling device is adapted to forward information received by one of the standard coupler interfaces or the redundant coupler interface to all other coupler interfaces. The coupling device can however also be adapted to forward information only between certain coupler interfaces.

It is advantageous if the control means are contained in the one of the standard coupler interface and the standard terminal interfaces connected to the critical link. Therewith, no additional control instance is required for operating the communication network system. Herewith, the cost of the system is further reduced.

It is further practical if the control means are contained in the coupling device, wherein the control means further control the information exchange between the interfaces, such that at a given time information is forwarded from only one of the coupler interfaces to other coupler interfaces, in particular to all other coupler interfaces. Therewith the control means take over the function of a superordinate control instance of the coupling device, avoiding collision of signals. In a coupling device without such a superordinate control instance message routing is initiated and performed without further interaction. That means, in case two terminals send messages at the same time, both messages are forwarded to other terminals. This leads to a collided signal traversing the network, which has to be avoided for the regular case, since the receiving terminals do not obtain any/full information from such a message exchange. The superordinate control instance according to the invention can operate according to two different methods:

i) the selection of the coupler interface from which the information is forwarded to other coupler interfaces at a certain time is based on a priority ranking with respect to the terminals connected to the respective coupler interfaces; i.e. information received from higher ranking coupler interfaces always have priority over information received from lower ranking coupler interfaces;

ii) the selection of the coupler interface from which the information is forwarded to other coupler interfaces at a certain time is based on a priori available knowledge about the expected transmit order in time regarding the connected terminals.

It is further practical, if the redundant coupler interface comprises the first blocking means, and the standard coupler interface connected to the critical link comprises the detection means, the second blocking means and the control means. This way all means for managing the link redundancy, namely the first and second blocking means, the detection means and the control means are contained in the coupling device. In this configuration it is easy to provide power and maintenance to these means for managing the link redundancy. Alternatively and/or additionally, the redundant terminal interface comprises first blocking means and the standard terminal interface comprises detection means, second blocking means and control means. Particularly, it is possible to use the same type of interface for both the terminal interfaces and the coupler interfaces.

Additionally, it is advantageous if the coupling device is an active star coupler, in particular a star coupler having three, four ore more standard coupler interfaces. The use of an active star coupler allows for high data rates and improves error containment.

It is further expedient, if at least one of the at least two terminals is a node for attaching an end device. It is further advantageous, if one of the at least two terminals is another coupling device. This way, a so called cascaded star-topology can be obtained for the communication network system. In a simple form of such a cascaded star-topology network two star couplers are connected to each other via a link connected to the respective standard coupler interfaces. The remaining standard coupler interfaces are connected to terminals or nodes of the communication network, allowing attachment of a number of end devices. In such a communication system containing two star couplers it is expedient to designate the link between the two star couplers to be a critical link, in which case a corresponding redundant link has to be provided between the two star couplers.

In order to assure, that the redundant link is not used unnecessarily, it is advantageous if the detection means are adapted to detect link recovery of the critical link, e.g. by detecting correct transmission of information in the critical link, the control means are adapted to control the first blocking means, such that they block the information received from and/or sent to the redundant link in response to a detection of link recovery of the critical link, and the second blocking means are adapted, such that, in response to a detection of link recovery of the critical link, they de-block the information received from and/or sent to the critical link. A detection of link recovery of the critical link means that no link fault is present in the critical link anymore. As a result of de-blocking the information received from the critical link, the second blocking means allow the information to be forwarded by the star coupler to at least another one of the coupler interfaces. According to this embodiment of the invention the redundant link is only used in case the critical link is not able to properly transmit respective information. As soon as the transmission capability of the critical link is restored, the redundant link is "switched off". This way the requirements regarding durability of the redundant link can possibly be lowered, which reduces the cost of the overall communication network system.

It is further advantageous, if the critical link and/or the redundant link is adapted to transmit information bi-directionally and the second blocking means are adapted to transmit information received from another coupler interface to the critical link, while blocking information received from the critical link due to a detection of a link fault in the critical link and/or the first blocking means are adapted to transmit the information received from another coupler interface to the redundant link independent of a detection of a link fault in the critical link. Put differently, the interfaces can be switched to transmit mode for bi-directional links. That means, even though a link failure is locally detected in the critical link for information received by the coupling device, both the standard coupler interface connected to the critical link and the redundant coupler interface will drive information to respective links. This way, the end device coupled to the critical link and the redundant link can be supplied with the same information from both links. This increases the data security of the information received by the end user, as in case of a partial loss in the information stream arriving from one of the two links, the respective information can be recovered using the signal received from the other link.

In order to increase the flexibility of the communication network system it is advantageous, if the critical link and/or the redundant link each comprises a uni-directional receiver link for transmitting information from one of the terminals to the coupling device and a uni-directional sender link for transmitting information from the coupling device to one of the terminals. This allows the adaptation of the inventive communication concept to systems operating with uni-directional links, i.e. the bi-directional link between a node and a star (or a star to star connection) consists of two uni-directional links - one dedicated cable for each direction.

It is further expedient, if the redundant coupler interface comprises second detection means for detecting a link fault in the redundant link, and the first blocking means are configured, such that they block the information received from and/or sent to the redundant link in response to a detection of a link fault in the redundant link. Therefore, a forwarding function for forwarding information from the redundant link or to the redundant link by the first blocking means is only enabled if no link fault is detected in the redundant link and an enable signal is sent by the control means, indicating a detection of a link fault in the critical link.

It is further advantageous, if the coupling device comprises a configuration input for receiving a configuration signal, and the coupler interfaces of the coupling device are each configurable by the configuration signal to be either a standard coupler interface or a redundant coupler interface. In particular, a distinction between the standard coupler interface and the redundant coupler interface in a fixed assignment approach could be mapped to an additional input. This allows a flexible adoption of the communication network system to requirements posted by specific configurations of end devices. The communication network system can therefore be customized according to given requirements. Further, both the coupler and the terminal interface function can be implemented using the same device. The side facing the link is the same—simply the other side facing either towards the coupling device or the terminal has to be implemented selectable.

In order to prevent a "hidden loss" of link redundancy, it is expedient, if the coupling device comprises an external monitor for monitoring a generation of the enable signal generated by the first blocking means. It is further practical, if the second detection means for detecting a link fault in the redundant link sends an enable signal to the second blocking means for causing a de-blocking of the information received from and/or sent to the critical link by the second blocking means. The presence of this second enable signal should also be monitored by the external monitor. As mentioned above, "hidden loss" of link redundancy can therefore be prevented and in case a link failure of either the critical link or the redundant link is identified by the external monitor, proper actions for restoring the functionality of the faulty link can be taken.

The above object is also solved according to the present invention by providing a method for communicating information comprising the steps of providing a coupling device having at least two standard coupler interfaces and a redundant coupler interface, and being adapted to exchange information between the interfaces; providing at least two standard links for transmitting information, one of which is a critical link, and each of which is connected to one of the standard coupler interfaces; providing a redundant link for transmitting information, which is associated with the critical link and is connected to the redundant coupler interface; providing at least two terminals, each having a standard terminal interface connected to one of the standard links, and at least one of which having a redundant terminal interface connected to the redundant link. The method according to the invention further contains the steps of providing one of the redundant coupler interface and the redundant terminal interface with first blocking means for blocking information received from and/or sent to the redundant link; providing one of the standard coupler interface connected to the critical link and the standard terminal interface connected to the critical link with: detection means for detecting a link fault in the critical link, and second blocking means for blocking information received from and/or sent to the critical link in response to a detection of a link fault in the critical link. Finally, the method according to the invention comprises the step of providing the communication network system with control means for controlling the first blocking means being adapted to send an enable signal to the first blocking means in response to a detection of a link fault in the critical link, causing a de-blocking of the information received from and/or sent to the redundant link by the fist blocking means.

Expressed differently, the method for communicating information according to the invention includes the steps of communicating information between at least two terminals via a communication channel, consisting of at least two standard links, one of which is a critical link, and each of which connects to one of at least two standard interfaces of a coupling device; blocking information from entering and/or exiting a redundant link via the redundant interface, which redundant link is associated with the critical link and which connects the coupling device via the redundant interface to the terminal connected to the critical link; monitoring the critical link for the occurrence of a link fault in the critical link; and in case of a detection of a link fault blocking information received from and/or sent to the critical link and causing the standard interface connected to the redundant link to de-block the information received from and/or sent to the redundant link, allowing the information to enter and/or exit the redundant link.

In the following, important features of the invention are described in other words:

In order to really profit from the link redundancy in a failure scenario, where one of two links is not available, additional means for redundancy management can be implemented. The proposal comprises the following elements:

Local link diagnosis is implemented. An interface to a link at the coupling device, advantageously in the form of a star coupler continuously monitors, whether the link is still available or not. As soon as an "unavailable link" is detected, this is signalled internally and a status change is performed accordingly. Link monitoring is subsequently continued. As soon as the link recovers and an "available link" is detected, this is signalled internally and a status change is performed accordingly.

The interface at the star coupler provides means to disable its own forwarding functionality due to the detection of an "unavailable link" (internal enabling/disabling of the link to device forwarding ability);

The interface at the star coupler provides means to command disabling of the forwarding functionality of another coupling device or star interface; per default this output is driven with the "disable" case command (external enabling/disabling of the link to device forwarding ability).

A link interface at the star coupler provides means to disable its own forwarding functionality due to a command by another star interface (external enabling/ disabling of the device to link forwarding ability).

As soon as the local link diagnosis detects the unavailability of the link, the message forwarding ability is disabled for the affected link. Control of the link to device forwarding function is determined by two inputs, the internal forward control and the external forward control. To enable the forward ability of the link to device star interface, both of these control signals have to command the "enable" case. If the internal, the external or both signals command the "disable" case, the link to device forwarding ability is put out of action. If the own forwarding ability is disabled, the link to device star interface has to signal the "enable" case command to its own external forward control output.

As described in detail above, by providing a critical link only between one or certain terminals and the coupling device with a back up link, namely the redundant link, the communication network system according to the invention allows an improvement in fault tolerance. At the same time the physical layer can be confined to a limited number of components and is therefore cost and space efficient.

Figure 2:
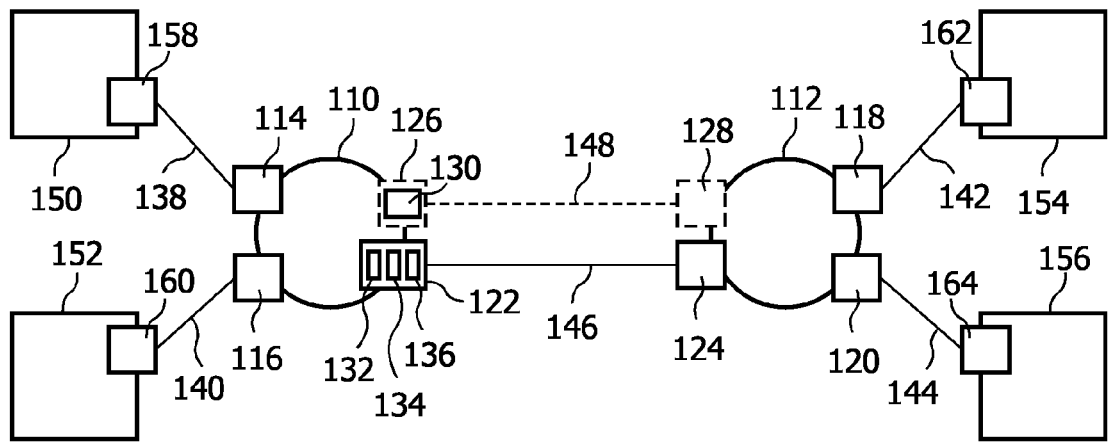

A detailed description of the present invention is provided herein below with reference to the following diagrammatic drawings, in which:

FIG. 1 is a schematic representation of a first embodiment of the communication network system according to the present invention; and FIG. 2 is a schematic representation of a second embodiment of the communication network system according to the present invention.

A first embodiment of the communication network system according to the present invention is shown in FIG. 1. The communication network system comprises a coupling device 10 in form of an active star coupler. The coupling device 10 is provided with standard coupler interfaces 12, 14, 16 and 18 and a redundant coupler interface 20. The redundant coupler interface 20 contains first blocking means 22. The standard coupler interface 12 contains detection means 24, second blocking means 26 and control means 28. Each one of the standard coupler interfaces 12, 14, 16 and 18 are connected to a respective one of standard links 30, 32, 34 and 36, while the standard link 30 constitutes a critical standard link. The redundant coupler interface 20 is connected to a redundant link 38. Further, terminals 40, 42, 44 and 46, constituting network nodes are provided. Each one of the terminals 40, 42, 44 and 46 contains a respective one of standard terminal interfaces 48, 50, 52 and 54. Terminal 40 further contains a redundant terminal interface 56. Each one of the standard terminal interfaces 48, 50, 52 and 54 is connected to a respective one of the standard links 30, 32, 34 and 36. The redundant terminal interface 56 is connected to the redundant coupler interface 20 via the redundant link 38.

Any one of the terminals 40, 42, 44 and 46 can transmit information to the coupling device 10 via the respective standard link 30, 32, 34 or 36. This information is then forwarded by the coupling device 10 to all remaining terminals. For example, an information sent from the terminal 40 via the critical standard link 30 to the coupling device 10 is forwarded to terminals 42, 44 and 46. An information originating at the terminal 40 it is supplied to both the standard terminal interface 48 and the redundant terminal interface 56 from which it is carried by the critical standard link 30 and the redundant link 38 to the standard coupler interface 12 and the redundant coupler interface 20, respectively. Per default, the first blocking means 22 contained in the redundant interface 20 blocks the information received from the redundant link 38. That means, the information is not forwarded to any other standard coupler interface 12, 14, 16 or 18. The information arriving at the standard coupler interface 12, however is forwarded as described above to the remaining standard coupler interfaces 14, 16 and 18.

The detection means 24 in the standard coupler interface 12 continuously monitor the critical link 30 for the occurrence of a link failure. Such a link failure is identified, if a link fault is detected in the critical standard link 30. The detection means 24 can be adapted to identify a link fault if the following requirements are met: missing activity or steady activity (for example shortage to one voltage level) in the critical standard link 30. For TDMA-systems, which are based on a repetitive cycle of defined length, missing activity could be derived from the fact that during a time interval greater than the communication cycle no message (=activity) has been received. This "failure detection latency" defines the maximum blackout time for the network.

In case of a detection of a link fault by the detection means 24 a signal is sent to the second blocking means 26 of the standard coupler interface 12 causing the information received from the critical standard link 30 to be blocked. Further, the control means 28 in the standard coupler interface 12 send an enable signal to the first blocking means 22. The enable signal causes the first blocking means 22 to lift the blocking of the information received from the redundant link 38. As a result the information sent by the terminal 40 is now routed via the redundant link 38 and the redundant coupler interface 20 into the coupling device 10. Here it is forwarded to the remaining standard coupler interfaces 14, 16 and 18.

In case the critical standard link 30 recovers, that means its capability for correctly transmitting information is restored, the detection means 24 detect correct transmission of information in the critical standard link 30. As a result, the control means 28 send a disable signal to the first blocking means 22, causing the information received from the redundant link 38 to be blocked by the first blocking means 22. At the same time the second blocking means 26 in the standard coupler interface 12 switch into "de-block mode" allowing the information received via the critical standard link 30 to pass and subsequently to be forwarded to the remaining terminals 42, 44 and 46.

The standard links 30, 32, 34 and 36 can be configured as bi-directional links, which are capable of transmitting information in both directions. In this case, information sent for example from terminal 44 is transmitted both via the critical standard link 30 and the redundant link 38 to terminal 40. That means neither the first blocking means 22 nor the second blocking means 26 block information running in this direction, while at a given time always one of the blocking means 22 and 26 are blocking information running in the reverse direction.

FIG. 2 shows a second embodiment of the communication network system according to the invention. This embodiment employs a so called cascaded star topology, as it contains two coupling devices 110 and 112 connected to each other, each constituting an active star coupler. The first coupling device 110 comprises standard coupler interfaces 114 and 116, while further standard coupler interfaces 118, 120 and 124 are part of the second coupling device 112. The first coupling device 110 further comprises a redundant coupler interface 126 containing first blocking means 130. The redundant coupler interface 126 is connected via a redundant link 148 to a redundant interface 128 of the second coupling device 112, which functions as a redundant terminal interface with respect to the first coupling device 110. The first coupling device 110 further comprises a standard coupler interface 122 containing detection means 132, second blocking means 134 and control means 136. The standard coupler interface 122 of the first coupling device 110 is connected to the standard coupler interface 124 of the second coupling device 112 via a critical standard link 146. The remaining standard coupler interfaces 114, 116, 118 and 120 are connected to standard terminal interfaces 158, 160, 162 and 164 of respective terminals 150, 152, 154 and 156, which are configured in form of network nodes.

The operation of the standard coupler interface 122 connected to the critical standard link 146 in conjunction with the redundant coupler interface 126 is analogous to the operation of the respective elements contained in the above described first embodiment of the invention. Although not specifically shown in the schematic representation of FIG. 2, the standard coupler interface 124 and the redundant interface 128 of the second coupling device 112 have the same functionality as the standard coupler interface 122 and the redundant coupler interface 126 of the first coupling device 110, respectively. That means, the redundant interface 128 also comprises first blocking means and the standard coupler interface 124 also comprises second blocking means, detection means and control means. Concerning data transfer from the first coupling device 110 to the second coupling device 112 the first and second blocking means, the detections means and the control means contained in the standard coupler interface 124 and the redundant interface 128 are operated accordingly.

Any reference signs in the claims shall not be construed as limiting the scope of the invention. While the invention has been described with respect to a limited number of embodi-

LIST OF REFERENCE NUMBERS:

10 coupling device
12 standard coupler interface
14 standard coupler interface
16 standard coupler interface
18 standard coupler interface
20 redundant coupler interface
22 first blocking means
24 detection means
26 second blocking means
28 control means
30 critical standard link
32 standard link
34 standard link
36 standard link
38 redundant link
40 terminal
42 terminal
44 terminal
46 terminal
48 standard terminal interface
50 standard terminal interface
52 standard terminal interface
54 standard terminal interface
56 redundant terminal interface
110 first coupling device
112 second coupling device
114 standard coupler interface
116 standard coupler interface
118 standard coupler interface
120 standard coupler interface
122 standard coupler interface
124 standard coupler interface
126 redundant coupler interface
128 redundant interface
130 first blocking means
132 detection means
134 second blocking means
136 control means
138 standard link
140 standard link
142 standard link
144 standard link
146 critical standard link
148 redundant link
150 terminal
152 terminal
154 terminal
156 terminal
158 standard terminal interface
160 standard terminal interface
162 standard terminal interface
164 standard terminal interface

The invention claimed is:

1. A communication network system comprising:
   at least two terminals, including:
      a first terminal including a first standard terminal interface, and
      a second terminal including a second standard terminal interface and a redundant terminal interface;
   a series of links to transmit information, including:
      a standard link connected to said first standard terminal interface,
      a critical standard link connected to said second standard terminal interface, and
      a redundant link connected to said redundant terminal interface;
   a series of coupler interfaces, including:
      a redundant coupler interface connected to said redundant link, including a first means for blocking information received from said redundant link until receiving an enable signal,
      a first standard coupler interface connected to said critical standard link comprising:
         means for detecting a link fault in said critical standard link, and
         a second means for blocking information received from said critical standard link in response to a detection of the link fault in said critical standard link, and
      a second standard coupler interface connected to said standard link;
   a coupling device connected to said first and second standard interfaces and said redundant coupler interface, said coupling device exchanging information between said coupler interfaces; and
   means for controlling said first means for blocking, wherein said means for controlling send an enable signal to said first means for blocking in response to said detection of the link fault in said critical standard link.

2. The system of claim 1, wherein said first standard coupler interface contains said means for controlling.

3. The system of claim 1, wherein said coupling device contains said means for controlling and wherein said means for controlling further control said information exchange between said coupler interfaces such that at a given time, information is forwarded from only one of said coupler interfaces to the other coupler interface.

4. The system of claim 1, wherein said coupling device is an active star coupler.

5. The system of claim 1, wherein at least one of said terminals is a node for attaching an end device.

6. The system of claim 5, wherein one of said terminals is another coupling device.

7. The system of claim 1, wherein:
   said means for detecting detect recovery of said critical standard link, so that said means for controlling respond by blocking said information received from said redundant link; and said second means for blocking de-block said information received from said critical standard link in response to a detection of link recovery of said critical standard link.

8. The system of claim 1, wherein:
   said critical standard link or said redundant link transmit information bi-directionally; and
   said second means for blocking transmit information received from another coupler interface to said critical standard link, while blocking information received from said critical standard link due said detection of said link fault in said critical standard link; and
   said first means for blocking transmit said information received from another coupler interface to said redundant link independent of said detection of said link fault in said critical standard link.

9. The system of claim 1, wherein at least one of said critical standard link and said redundant link further comprises:
 a unidirectional receiver link to transmit information from one of said terminals to said coupling device; and
 a unidirectional sender link to transmit information from said coupling device.

10. The system of claim 1, wherein:
 said redundant coupler interface further comprises second means for detecting said link fault in said redundant link; and
 said first means for blocking blocks said information received from said redundant link in response to a detection of said link fault in said redundant link.

11. The system of claim 1, wherein:
 said coupling device further comprises a configuration input for receiving a configuration signal; and
 said coupler interfaces are each configurable by said configuration signal to be either a standard coupler interface or a redundant coupler interface.

12. The system of claim 1, wherein said coupling device further comprises:
 an external monitor for monitoring a generation of said enable signal by said first blocking means.

* * * * *